United States Patent Office

3,582,500
Patented June 1, 1971

3,582,500
PROCESS FOR THE MANUFACTURE OF A PRODUCT OF POLYURETHANE FOAM REINFORCED BY FIBRES
Jean Paul Carriere, Anieres, Geneva, and Alexis Archipoff, Carrouge, Geneva, Switzerland, assignors to Centre International pour l'Economie et la Technologie I.C.E.T., Rixensart, Belgium
No Drawing. Filed Oct. 21, 1968, Ser. No. 769,227
Claims priority, application Belgium, Oct. 25, 1967, 14,925
Int. Cl. C08g 22/44
U.S. Cl. 260—2.5                    5 Claims

ABSTRACT OF THE DISCLOSURE

In a process for the manufacture of a flat polyurethane foam reinforced by fibers, wherein the fibers and a reaction mixture comprising at least one organic polyol and one organic polyisocyanate are mixed and reacted in the presence of a substance capable of liberating water under the influence of heat in a sufficient amount to permit the liberation of an amount of water needed for foaming at a temperature between the temperature at which water of hydration is liberated and the temperature corresponding to the limit of stability of the polyurethane formed characterized in that borax is the substance capable of liberating water, the improvement wherein the mixing and reaction occurs in the presence of a water fixing amount of an inert hygroscopic inorganic substance capable of fixing any water liberated by the borax while dissolved in the reaction mixture until the temperature of said mixture is raised above the temperature at which water of hydration is liberated from the borax.

---

The subject of the present invention is a process for the manufacture of a flat product of polyurethane foam reinforced by fibres. By "flat product" there are understood more or less thick, and more or less supple foils or sheets.

As is known, the incorporation of various fibres, especially glass fibres or synthetic fibres such as nylon, into a plastic material generally results in an improvement of the mechanical strength of the latter. Such an improvement is particularly advantageous in the case of polyurethane foams. In fact, the incorporation of appropriate quantities of fibres into polyurethane foams results in a material which in addition to having the properties of polyurethane foams has an improved mechanical strength, particularly an increased compressive strength relative to that of polyurethane foams of the same density. In other words, at a given mechanical strength polyurethane foams reinforced by being charged with fibres are lighter than polyurethane foams of the same composition but not containing fibres, and this is evidently an advantage in the majority of uses of such foams.

Amongst the uses of polyurethane foams in which the reinforcement by fibres incorporated into the foam produces major advantages are included the manufacture of cushions, mattresses and shock-absorbing materials used in particular in furniture, automobiles and building. In the form of more or less thick and more or less supple foils, reinforced polyurethane foams can find a particularly valuable application as a floor covering layer or a floor covering underlay or support, or as sound insulation and/or heat insulation sheets in building.

The incorporation of fibres, which are frequently obtained as waste from the manufacture of textiles and other materials, into polyurethane foams which are a product of high quality but of relatively high cost furthermore has the advantage of lowering the cost price since the fibres which can be used for this purpose are generally starting materials of markedly lower price than that of the substances used for the manufacture of polyurethane foams.

One of the greatest problems which arises in carrying out such processes is how to incorporate homogeneously a major quantity of fibres into the foam. As is known, the reactions which take place in the reaction mixture and lead to the formation of the foam are in fact very rapid and result in an increase in viscosity accompanying the foaming or "rise" of the foam which in practice only leaves a very limited time for introducing a filler into the mixture. In order to make it possible homogeneously to incorporate fibres into the foam it has already been proposed to replace the water in the reaction mixture by at least one substance which is capable of liberating water under the influence of heat at a temperature between 30° C. and the temperature corresponding to the limit of stability of the polyurethane, the amount of the said substance being so determined as to allow the amount of water needed for foaming to be obtained, the mixture being heated to a temperature at least equal to the temperature at which the water is liberated.

As a result, all the time needed to incorporate homogeneously a major amount of fibres into the reaction mixture is available if the temperature is kept below the temperature at which the water is liberated.

As substances capable of liberating water there have already been proposed hydrated metal salts and aluminosilicates of alkali metals such as natural or artificial zeolites, in particular the substances known commercially as "molecular sieves," or silica gel or activated alumina.

The molecular sieves suffer from the disadvantage that they must be treated before use so as to absorb water, and this results in a loss of time and adds to the cost.

Furthermore, certain hydrated metal salts such as barium chloride suffer from the disadvantage of increasing the amount of fillers incorporated into the final product and being costly.

Furthermore it has proved inadvisable in this technique to use hydrated salts of sodium or potassium.

It has now been found, during researches within the range of the present invention, that amongst hydrated metal salts of sodium, borax has very valuable properties because it can be use in reduced amounts as a result of the fact that one molecule of borax $Na_2B_4O_7 \cdot 10H_2O$ can liberate 8 molecules of water.

Thus it suffices to use small quantities of this salt in order to have available the requisite amounts of water (9.3 g. of borax suffice to liberate 3.5 g. of water).

It has however been observed that borax is slightly soluble in the polyol, to the extent of about 1% by weight. On dissolving, the borax loses a certain quantity of water which runs the danger of reacting with the isocyanate, which would have the effect of raising the temperature of the mixture and causing an increase in viscosity and possibly the commencement of foaming.

According to the invention it has been found that this disadvantage can be remedied by using borax conjointly with a hygroscopic inert mineral substance which is capable of fixing the water liberated by the borax dissolved in the reaction mixture.

The borax and the hygroscopic inert substance will preferably be used in the form of fine powders which will be mixed before incorporating them in the reaction mixture.

Amongst the inert hygroscopic substances, copper sulphate and sodium sulphate will preferably be used.

Since one molecule of either of these two substances can become hydrated with five molecules of water, these substances will, in the reaction mixture, be used in an amount at least equal to 2% by weight of the borax, in gram molecules.

As a reaction mixture capable of forming the polyurethane foam, the mixtures usually employed in the manufacture of polyurethane foams will be used, that is to say mixtures containing at least one polyether or polyester polyol, at least one organic polyisocyanate, at least one salt of bivalent tin with a fatty acid, playing the role of catalyst for the reaction of the polyol with the polyisocyanate, and at least one surface-active agent. Given that the foaming only takes place after heating the mixture to a more or less high temperature depending on the substance used but always a temperature above ambient temperature, it is possible to carry out the process in the absence of the tertiary amine which is usually employed as the catalyst for the reaction of water with the polyisocyanate which is responsible for the foaming.

As the polyol based on polyether, there will for example be used diols such as polypropylene glycol or triols or polyols containing more than three functional hydroxyl groups obtained by adding molecules of propylene oxide or molecules of ethylene oxide and propylene oxide to compounds possessing active hydrogen atoms such as polyalcohols or polyamines.

As polyester-based polyols, the reaction products of at least one polyalcohol with at least one organic polyacid, especially an aliphatic polyacid, will be used. The said polyalcohol will be a diol such as ethylene glycol, propylene glycol, trimethylene glycol, diethylene glycol, dipropyene glycol, butanediol-1,3, butanediol-1,4 or a polyalcohol containing more than two hydroxyl groups such as glycerine, sorbitol, pentaerythritol, inositol, etc.

As the organic polyisocyanate, the following polyisocyanates will especially be employed: 2,4- and 2,6-toluylene diisocyanate, 1,4- and 1,5-naphthylene diisocyanate, 4,4'-diphenylmethane diisocyanate, para-phenylene diisocyanate, hexamethylene 1,4-diisocyanate, triphenylmethane 4,4',4''-triisocyanate, and polymethylene polyphenylisocyanate containing 3 to 5 benzene nuclei. A mixture of these polyisocyanates may be used.

Stannous octoate will for example be used as the salts of bivalent tin with fatty acids.

Silicone oils usually employed in the manufacture of supple polyurethane foams will be used as surface-active agents.

Any of the inorganic or organic, natural, artificial or synthetic known fibres may be used as fibres. It is for example possible to use glass fibres, asbestos fibres, polyamide fibres such as "nylon 66," polyacrylonitriles fibres, polyvinyl chloride fibres, polyolefine fibres, viscose fibres, silk, wool or cotton.

These fibers may be used in the form of "flocks" or fibres cut to an essentially equal length within a given batch. It is also possible to use a web of fibres which are heterogene from the point of view of their length, their gauge and their nature.

The following examples, without imposing a limitation, show some of the ways in which the process according to the invention may be carried out.

EXAMPLE 1

The following substances, used in the proportions by weight indicated below (in grams), are intimately mixed at ambient temperature by means of a rotating stirrer running at a speed of between 1000 and 1500 revolutions per minute:

Polyol "Niax 14–46" (a polyether triol of OH—No. 46, average mol. wt., 3,500; hydroxyl No. mg. KOH/g. 47.3; spec. gravity at 20° C., 1.0206; average visc. cps. at 25° C., 520 _____ 100
Toluylene diisocyanate _____ 58.2
Silicone oil "SF 1066" (a dimethyl polyalkylene ether copolymer organo-silicone surfactant having a nominal viscosity of 1200–1500 centistokes at 25° C. and manufactured by General Electric) _ 2.6
Borax _____ 13.2
$CuSO_4$ _____ 0.2
Stannous octoate _____ 0.2

When the mixture has been well homogenized it is poured onto an amount of nylon "flocks" of 2 mm. length and gauge equivalent to 20 deniers, representing 40% of the total weight of the assembly of reaction mixture and fibres. A mechanical malaxating process is then carried out so as to incorporate the fibres perfectly homogeneously in the reaction mixture. After this homogeneous mixture obtained is poured onto a metal plate coated with polytetrafluoroethylene ("Teflon") and the thin layer thus obtained is covered by a supple "Teflon" film. The whole is repeatedly passed through the space between the two rollers and layer-sheets assembly is finally kept in an oven at 90° C. for 2 hours. A sheet of a perfectly homogeneous product of thickness 12 to 13 mm. and a density of 110 grams per litre is obtained, consisting of the polyurethane foam containing dispersed nylon fibres distributed uniformly through the mass of foam. This product has mechanical properties which are significantly improved compared to those of a polyurethane foam of the same density but not containing fibres. The following table demonstrates the improvement obtained by adding fibres, in respect of the compressive strength:

|  | Compressive strength (in percent of initial thickness) under— | | | |
| --- | --- | --- | --- | --- |
|  | 1 kg./cm.² | 2 kg./cm.² | 5 kg./cm.² | 10 kg./cm.² |
| Product according to the present example__ | 56 | 48 | 24 | 20 |
| Polyurethane foam of the same density (110 g./l.) without fibres___ | 34.3 | 28 | 17.4 | 13 |

EXAMPLE 2

The reaction mixture of the preceding example is used, using sodium sulphate instead of copper sulphate as the hygroscopic inorganic substance.

This reaction mixture is spread on a metal plate coated with "Teflon" and a quantity of nylon "flocks" 30 mm. in length and a gauge equivalent to 40 deniers, representing 40% of the total weight of the assembly of reaction mixture and fibers, is deposited on the viscous layer thus produced. Before having been deposited on the layer of reaction mixture, the fibres are separated from one another by treatment with air in an appropriate enclosure which forms a cyclone. The fibres are distributed in the form of a "pneumatic" web or mat of uniform thickness and density and a second metal plate coated with "Teflon" is thereafter applied to the whole on the side brought into contact with the fibres, this plate being of the same size as the base plate (30 x 30 cm.) A pressure corresponding to a force of 20 kg. is applied to the upper plate for 10 minutes. The pressure is then removed but the upper plate is left in position and the whole is placed in an oven wherein a temperature of 90° C. is maintained for 2 hours. A foil of a homogeneous product, of thickness 9 to 11 mm. and a density of 185 g./l. is thus obtained. The table which follows demonstrates the improvement in compressive strength compared to that of a polyurethane foam of the same density but not containing fibres.

|  | Compressive strength (in percent of initial thickness) under— | | | |
| --- | --- | --- | --- | --- |
|  | 1 kg./cm.² | 2 kg./cm.² | 5 kg./cm.² | 10 kg./cm.² |
| Product according to the present example__ | 77.8 | 64.5 | 48.8 | 37.8 |
| Polyurethane foam of the same density (185 g./l.) without fibres___ | 40 | 30.5 | 20 | 16 |

EXAMPLE 3

The procedure of Example 1 is followed but instead of a web of nylon "flocks" a web of viscose fibres of 15 deniers, weighing 150 g./m.$^2$, is used and the reaction mixture is spread on a double layer of this web.

A homogeneous foil of density 125 g./l. is obtained which contains 29% by weight of fibres distributed perfectly uniformly in the resulting product. The Table which follows demonstrates the improvement in compressive strength relative to that of a polyurethane foam of the same composition and same density which does not contain fibres.

|  | Compressive strength (in percent of initial thickness) under— | | | |
| --- | --- | --- | --- | --- |
|  | 1 kg./cm.$^2$ | 2 kg./cm.$^2$ | 5 kg./cm.$^2$ | 10 kg./cm.$^2$ |
| Product according to the present example | 60 | 50 | 30 | 20 |
| Polyurethane foam of the same density (125 g./l.) without fibres | 35.5 | 28.5 | 18 | 13.5 |

A further subject of the present invention is the product obtained by the above process. This product is not only characterized by perfectly uniform distribution of the fibres within the foam but also by perfect homogeneity of the entire product.

What we claim is:

1. In a process for the manufacture of a flat polyurethane foam reinforced by fibers, wherein the fibers and a reaction mixture comprising at least one organic polyol and one organic polyisocyanate are mixed and reacted in the presence of a substance capable of liberating water under the influence of heat in a sufficient amount to permit the liberation of an amount of water needed for foaming at a temperature between the temperature at which water of hydration is liberated and the temperature corresponding to the limit of stability of the polyurethane formed, characterized in that borax is the substance capable of liberating water, the improvement wherein the mixing and reaction occurs in the presence of a water fixing amount of an inert hygroscopic inorganic substance capable of fixing any water liberated by the borax while dissolved in the reaction mixture until the temperature of said mixture is raised above the temperature at which water of hydration is liberated from the borax.

2. A process according to claim 1, characterized wherein the inert hygroscopic inorganic substance is selected from the group consisting of copper sulphate and sodium sulphate.

3. A process according to claim 1, wherein the inert hygroscopic inorganic substance is selected from the group consisting of copper sulphate and sodium sulphate, the amount of the said substance being of at least 2% by weight of borax in gram molecules.

4. A process according to claim 1, wherein the inert hygroscopic inorganic substance is mixed with the borax before being incorporated in the reaction mixture.

5. A process according to claim 1, wherein the inert hygroscopic inorganic substance is selected from the group consisting of copper sulphate and sodium sulphate, said substance being mixed with the borax before being incorporated in the reaction mixture.

References Cited

UNITED STATES PATENTS

| 2,977,330 | 3/1961 | Brower | 260—2.5 |
| 3,154,521 | 10/1964 | Terek et al. | 260—75 |
| 3,256,218 | 6/1966 | Knox | 2.5 |
| 3,280,048 | 10/1966 | Griffin et al. | 260—2.5 |

FOREIGN PATENTS

| 1,020,777 | 2/1966 | Great Britain | 260—2.5 |

OTHER REFERENCES

German Patentanmeldung based on Ser. No. F 18242 IVb/39b, 2 pages (1956).

Morton, Laboratory Technique in Organic Chemistry, pages 15–16, call number QD 261.M74 (1938).

DONALD E. CZAJA, Primary Examiner

D. J. BARRACK, Assistant Examiner